United States Patent
Mizutani et al.

(10) Patent No.: US 8,451,163 B2
(45) Date of Patent: May 28, 2013

(54) WEATHER RADAR APPARATUS AND WEATHER OBSERVATION METHOD

(75) Inventors: Fumihiko Mizutani, Kawasaki (JP); Masakazu Wada, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 317 days.

(21) Appl. No.: 13/013,189

(22) Filed: Jan. 25, 2011

(65) Prior Publication Data

US 2011/0234453 A1 Sep. 29, 2011

(30) Foreign Application Priority Data

Mar. 25, 2010 (JP) ................................ 2010-070580

(51) Int. Cl.
*G01S 13/95* (2006.01)
(52) U.S. Cl.
USPC .............................. 342/26 R; 342/74; 342/81
(58) Field of Classification Search
USPC .............................................. 342/26 R–26 D
See application file for complete search history.

(56) References Cited

U.S. PATENT DOCUMENTS

| | | | | |
|---|---|---|---|---|
| 6,018,307 | A * | 1/2000 | Wakayama et al. | 342/26 D |
| 6,456,227 | B2 * | 9/2002 | Wada et al. | 342/26 R |
| 7,205,928 | B1 * | 4/2007 | Sweet | 342/26 B |
| 7,242,343 | B1 * | 7/2007 | Woodell | 342/26 B |
| 7,307,576 | B1 * | 12/2007 | Koenigs | 342/26 R |
| 7,307,583 | B1 * | 12/2007 | Woodell et al. | 342/173 |
| 7,372,394 | B1 * | 5/2008 | Woodell et al. | 342/26 R |
| 7,417,578 | B1 * | 8/2008 | Woodell et al. | 342/26 R |
| 2010/0253574 | A1 | 10/2010 | Mizutani et al. | |
| 2010/0328144 | A1 | 12/2010 | Mizutani et al. | |

OTHER PUBLICATIONS

Takashi Yoshida, "Radar Technology (Revised Version)", ISBN 4-88552-139-4, pp. 119, 238, and 239.

* cited by examiner

*Primary Examiner* — Jack Keith
*Assistant Examiner* — Matthew M Barker
(74) *Attorney, Agent, or Firm* — Oblon, Spivak, McClelland, Maier & Neustadt, L.L.P.

(57) ABSTRACT

According to one embodiment, a weather radar apparatus includes an antenna unit, a drive unit, an adjustment unit, and a control unit. The antenna unit is configured to transmit radio waves from a plurality of antenna elements, perform beam scan in a direction of elevation angle by phase control, and receive waves reflected by a weather target. The drive unit is configured to drive an elevation angle and an azimuth angle of an aperture plane of the antenna unit. The adjustment unit is configured to adjust an observation range and an observation elevation angle by the antenna unit and the drive unit in accordance with a plurality of observation modes. The control unit is configured to set the observation mode based on a received signal of the reflected waves.

6 Claims, 2 Drawing Sheets

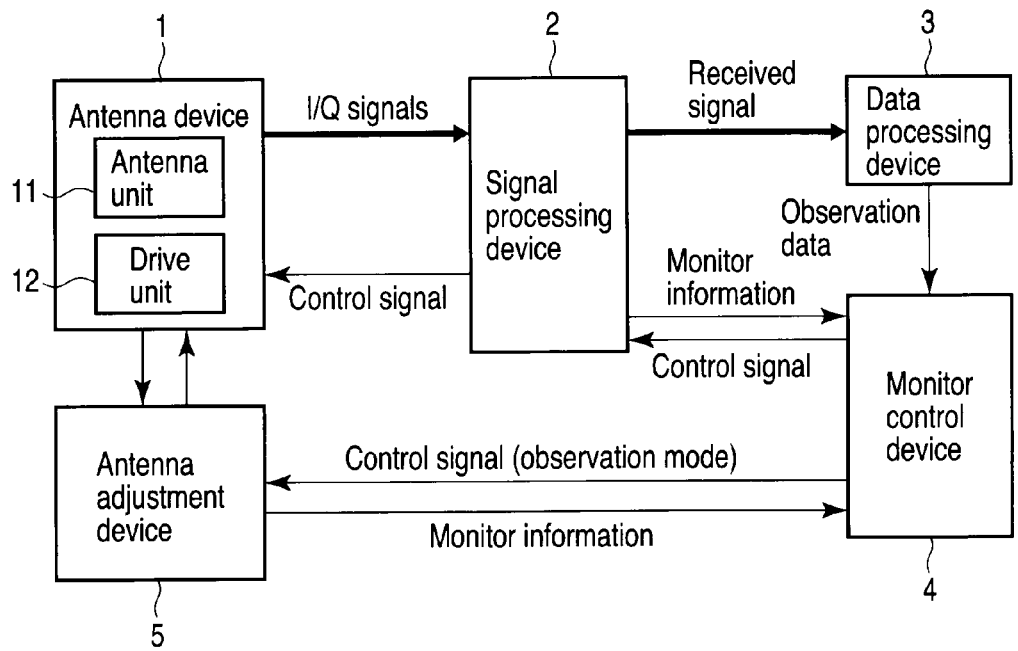
F I G. 1
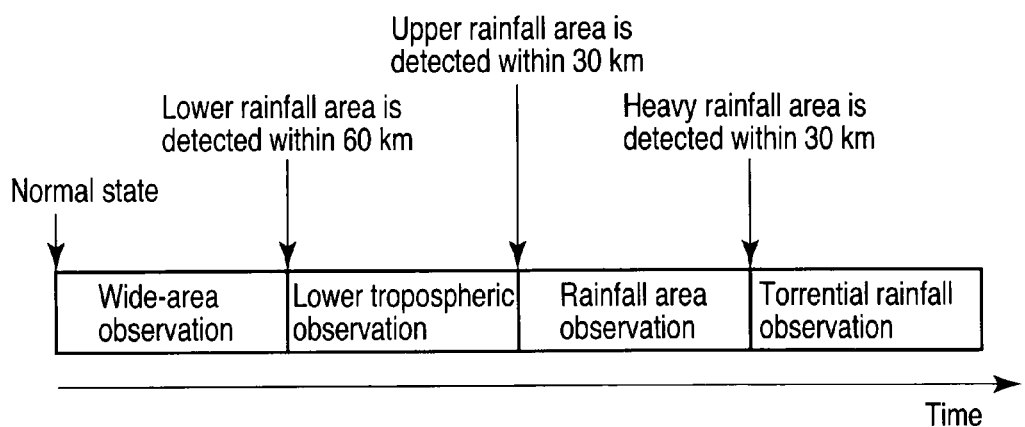
F I G. 2

WEATHER RADAR APPARATUS AND WEATHER OBSERVATION METHOD

CROSS-REFERENCE TO RELATED APPLICATIONS

This application is based upon and claims the benefit of priority from Japanese Patent Application No. 2010-070580, filed Mar. 25, 2010; the entire contents of which are incorporated herein by reference.

FIELD

Embodiments described herein relate generally to a weather radar apparatus and a weather observation method for observing weather phenomena such as a rainfall and clouds.

BACKGROUND

A conventional parabolic antenna weather radar forms a thin beam called a pencil beam and horizontally rotates it through 360° to acquire observed data of one plane. Then, the elevation angle of the antenna is increased to acquire the next plane. This operation is continued, thereby collecting three-dimensional precipitation data (for example, "Radar Techniques", revised edition compiled under the supervision of Takashi Yoshida, IEICE, Oct. 1, 1996, first edition, chap. 3, Meteorological Radar, pp. 238-239). Executing this observation sequence requires 5 to 10 minutes. It is therefore impossible to obtain sufficient time resolution and spatial resolution for observation of, for example, cumulonimbus clouds which change from hour to hour.

BRIEF DESCRIPTION OF THE DRAWINGS

FIG. 1 is a block diagram showing an example of the arrangement of a weather radar apparatus according to the embodiment;

FIG. 2 is a view showing an example of the observation procedure of the weather radar apparatus in FIG. 1;

DETAILED DESCRIPTION

Figure 3:
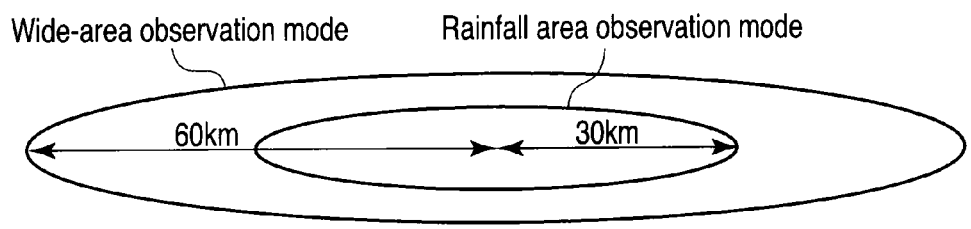
FIG. 3 is a view showing the observation range of a wide-area observation mode and that of a rainfall area observation mode.

In general, according to one embodiment, a weather radar apparatus includes an antenna unit, a drive unit, an adjustment unit, and a control unit. The antenna unit is configured to transmit radio waves from a plurality of antenna elements, perform beam scan in a direction of elevation angle by phase control, and receive waves reflected by a weather target. The drive unit is configured to drive an elevation angle and an azimuth angle of an aperture plane of the antenna unit. The adjustment unit is configured to adjust an observation range and an observation elevation angle by the antenna unit and the drive unit in accordance with a plurality of observation modes. The control unit is configured to set the observation mode based on a received signal of the reflected waves.

Hereinafter, embodiments will now be described in detail with reference to the accompanying drawing.

FIG. 1 shows an example of the arrangement of a weather radar apparatus according to the embodiment. Referring to FIG. 1, the weather radar apparatus includes an antenna device 1, signal processing device 2, data processing device 3, monitor control device 4, and antenna adjustment device 5.

The antenna device 1 comprises an antenna unit 11, and a drive unit 12. The antenna unit 11 is formed from, for example, a one-dimensional phased-array antenna including a plurality of antenna elements in the vertical direction. The antenna unit 11 transmits radio waves from the plurality of antenna elements in accordance with a control signal from the signal processing device 2, performs beam scan in the direction of elevation angle by phase control, and receives waves reflected by a weather target such as a rainfall.

The weather radar apparatus needs to observe a weather target in an arbitrary space. For this reason, the drive unit 12 mechanically controls the azimuth angle and elevation angle of the aperture plane of the antenna unit 11 by, for example, rotating a drive motor in accordance with a control signal from the antenna adjustment device 5.

The antenna adjustment device 5 adjusts the observation range and the observation elevation angle by the antenna unit 11 and the drive unit 12 in accordance with a plurality of observation modes corresponding to combinations of at least the observation range and the observation elevation angle. Details of the observation modes will be described later. The observation mode is set based on a control signal from the monitor control device 4.

Upon receiving the wave reflected by a weather target on the space, the antenna device 1 digitizes the received analog signal, detects I/Q waves, and passes the detected I/Q signals to the signal processing device 2.

The signal processing device 2 calculates the received power and Doppler velocity from the I/Q signals from the antenna device 1. The signal processing device 2 also transmits a phase control signal for determining the radar wave output angle to the antenna device 1 in accordance with a control signal from the monitor control device 4.

The data processing device 3 calculates observed data such as a rainfall rate or a corrected Doppler velocity from the received power or Doppler velocity data calculated by the signal processing device 2.

The monitor control device 4 outputs control signals to the devices and generally manages monitor information of the units in accordance with an observation procedure to be described later.

The observation procedure to be executed by the weather radar apparatus with the above-described arrangement will be described next. FIG. 2 shows an example of the observation procedure.

The monitor control device 4 determines the observation mode based on observed data such as the rainfall rate or corrected Doppler velocity from the data processing device 3, and sends a control signal for instructing observation mode switching to the antenna adjustment device 5. For example, as shown in FIG. 2, the monitor control device 4 sets a wide-area observation mode in a normal state wherein no rainfall area (weather target) is detected, a lower tropospheric observation mode upon detecting a lower rainfall area within 60 km, a rainfall area observation mode upon detecting an upper rainfall area within 30 km, and a torrential rainfall observation mode upon detecting a heavy rainfall area within 30 km.

The antenna adjustment device 5 controls the antenna unit 11 and the drive unit 12 in accordance with the observation mode designated by the control signal from the monitor control device 4, thereby adjusting the observation range and the observation elevation angle. FIG. 3 shows the observation range of the wide-area observation mode and that of the rainfall area observation mode. For example, the antenna adjustment device 5 sets the maximum search range to 60 km from the antenna center in the wide-area observation mode, and to 30 km from the antenna center in the rainfall area observation mode. The antenna adjustment device 5 may make the observation azimuth angle in the rainfall area observation mode narrower than that in the wide-area observation mode. For example, when a heavy rainfall exists at an azimuth angle of 90°, the observation azimuth angle is narrowed to 45 to 135°.

Figure 4:
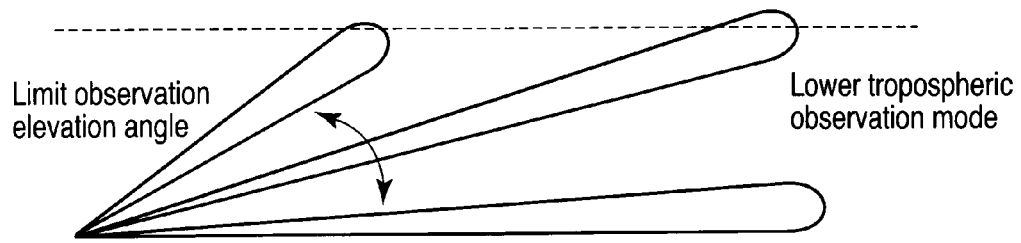
FIG. 4 is a view showing the observation elevation angle in a lower tropospheric observation mode.
Figure 5:
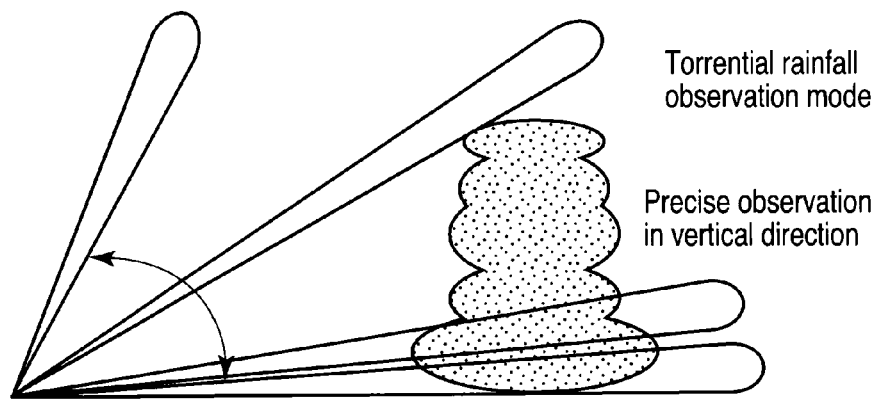
FIG. 5 is a view showing the observation elevation angle in a torrential rainfall observation mode.

FIG. 4 shows the observation elevation angle in the lower tropospheric observation mode. FIG. 5 shows the observation elevation angle in the torrential rainfall observation mode. In the torrential rainfall observation mode, the antenna adjustment device 5 widens the range of the observation elevation angle to improve the vertical observational accuracy. In the lower tropospheric observation mode, the antenna adjustment device 5 limits the range of the observation elevation angle to make the pulse repetition period shorter than in the torrential rainfall observation mode. This increases the number of transmission pulses and thus increases the number of pulses per position, thereby improving the observational accuracy by the averaging effect on the weather echo.

As described above, the weather radar apparatus according to the above-described embodiment comprises the antenna adjustment device 5 which adjusts the observation range and the observation elevation angle by the antenna unit 11 and the drive unit 12 in accordance with the plurality of observation modes, and the monitor control device 4 which sets the observation mode of the antenna adjustment device 5 based on observed data obtained from the received signal of reflected waves. More specifically, when the apparatus is used to detect the presence of a weather echo in, for example, fine weather, the elevation angle is adjusted to set the antenna to the farthest direction in a wide observation range. If a critical atmospheric phenomenon such as development of cumulonimbus clouds has occurred, the observation range is limited, and the antenna is adjusted to the elevation angle for the core of the cumulonimbus clouds, thereby finely observing the vicissitudes of the cumulonimbus clouds.

Hence, according to the above-described embodiment, it is possible to detect and accurately observe all unexpected local weather phenomena such as abrupt development of cumulonimbus clouds.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A weather radar apparatus comprising:
   an antenna unit configured to transmit radio waves from a plurality of antenna elements, perform beam scan in a direction of elevation angle by phase control, and receive waves reflected by a weather target;
   a drive unit configured to drive an elevation angle and an azimuth angle of an aperture plane of the antenna unit;
   an adjustment unit configured to adjust an observation range and an observation elevation angle by the antenna unit and the drive unit in accordance with a plurality of observation modes; and
   a control unit configured to set the observation mode based on a received signal of the reflected waves.

2. The apparatus according to claim 1, wherein the adjustment unit has a first observation mode in which the observation elevation angle is adjusted to a first observation elevation angle and a second observation mode in which the observation elevation angle is adjusted to a second observation elevation angle narrower than the first observation elevation angle, and a pulse repetition period of the radio waves in the second observation mode is made shorter than that in the first observation mode.

3. The apparatus according to claim 1, wherein the adjustment unit has a third observation mode in which the observation range is adjusted to a first observation range and a fourth observation mode in which the observation range is adjusted to a second observation range narrower than the first observation range, and an observation azimuth angle in the fourth observation mode is made narrower than that in the third observation mode.

4. A weather observation method used by a weather radar apparatus including an antenna unit configured to transmit radio waves from a plurality of antenna elements, perform beam scan in a direction of elevation angle by phase control, and receive waves reflected by a weather target, and a drive unit configured to drive an elevation angle and an azimuth angle of an aperture plane of the antenna unit, comprising:
   adjusting an observation range and an observation elevation angle by the antenna unit and the drive unit in accordance with a plurality of observation modes; and
   setting the observation mode based on a received signal of the reflected waves.

5. The method according to claim 4, wherein the adjusting has a first observation mode in which the observation elevation angle is adjusted to a first observation elevation angle and a second observation mode in which the observation elevation angle is adjusted to a second observation elevation angle narrower than the first observation elevation angle, and a pulse repetition period of the radio waves in the second observation mode is made shorter than that in the first observation mode.

6. The method according to claim 4, wherein the adjusting has a third observation mode in which the observation range is adjusted to a first observation range and a fourth observation mode in which the observation range is adjusted to a second observation range narrower than the first observation range, and an observation azimuth angle in the fourth observation mode is made narrower than that in the third observation mode.

* * * * *